No. 647,754. Patented Apr. 17, 1900.
R. MACRAE.
STORAGE BATTERY ELECTRODE.
(Application filed Nov. 17, 1899.)
(No Model.)
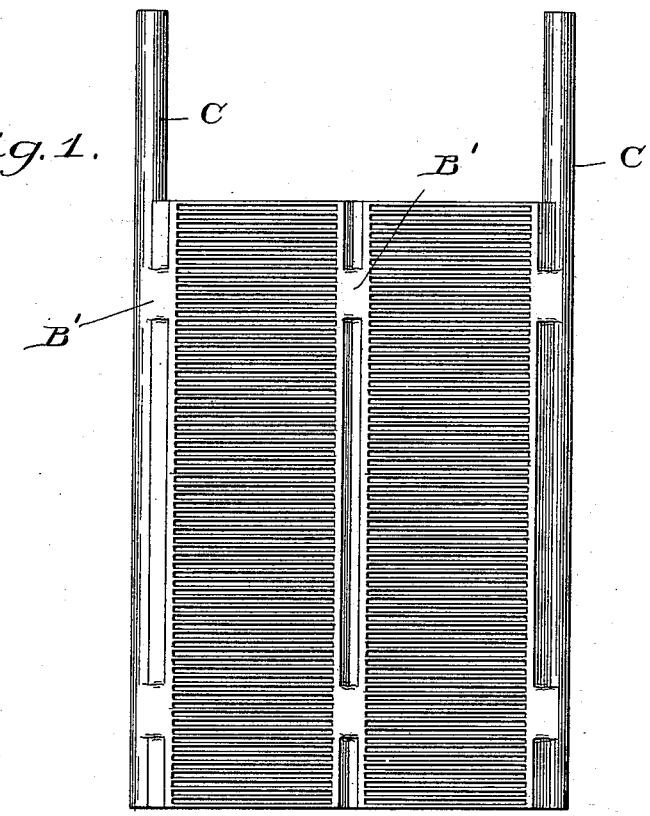
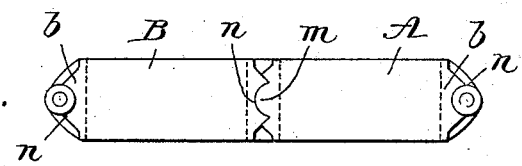
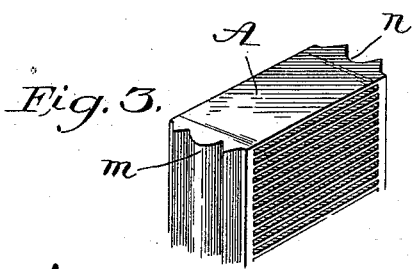
WITNESSES: INVENTOR
A. V. Groupe Roderick Macrae
C. E. Parker BY
 J. N. Fenton
 ATTORNEY

UNITED STATES PATENT OFFICE.

RODERICK MACRAE, OF PHILADELPHIA, PENNSYLVANIA, ASSIGNOR OF ONE-HALF TO WILLIAM C. L. EGLIN, OF SAME PLACE.

STORAGE-BATTERY ELECTRODE.

SPECIFICATION forming part of Letters Patent No. 647,754, dated April 17, 1900.

Application filed November 17, 1899. Serial No. 737,278. (No model.)

*To all whom it may concern:*

Be it known that I, RODERICK MACRAE, a subject of the Queen of Great Britain, residing at Philadelphia, Pennsylvania, have invented certain new and useful Improvements in Storage-Battery Electrodes, of which the following is a full, clear, and exact description, reference being had to the accompanying drawings, forming a part of this specification.

My invention relates to electrodes for storage and other batteries; and it consists in the novel features of construction hereinafter described and claimed—namely, first, in the construction of the elemental unit-plate of which the specific battery-plate shown in the drawings is composed in part, and, second, in the specific combination therewith of another unit-plate of the character described in pending application, Serial No. 714,280, filed by me, whereby small battery-electrodes of very large active surface and effective character may be constructed with economy and facility.

In the accompanying drawings, Figure 1 is a front elevation of an improved battery-electrode embodying my invention; Fig. 2, a plan view thereof, and Fig. 3 a perspective view of the novel elemental unit-plate employed in making up the small two-plate battery illustrated in Fig. 1 and constituting one feature of my present invention.

That underlying feature of the device which consists in forming an integral slatted structure by uniting at the edges of their opposite ends a series of spaced plates or flat lead strips and building up on the series a solid edge portion by means of a mass of applied solder I do not claim herein, as it forms the subject of a separate and now-pending application, Serial No. 712,270; nor do I claim herein that feature of the device of Fig. 1 which consists of the elemental unit-plate formed with longitudinal grooves *n* in the vertical edge portions *b* of the applied solder mass, that construction forming the subject of a pending application filed by me as Serial No. 714,280.

The novel elemental unit-plate in the present device is shown separately in Fig. 3, and it consists of a series of short lead strips or plates which are first spaced from each other by interposed or integral flanges arranged transversely, these spaced plates A being united at their end edges by a solder mass applied thereto, whereby an integral solid vertical edge piece is formed, as indicated at *b b*. In forming the elemental unit shown in Fig. 3 I proceed in the same way as far as thus stated; but having formed such solder edges *b b*, the structure is then run through an appropriate machine to form on each of its vertical solder edges a bead or rib *m* on one of them and a groove *n* on the other of them, as shown in said Fig. 3 and on right-hand side of Fig. 2.

In pending application Serial No. 714,280 I have shown and described a similar construction other than that both the solid vertical edges *b b* are formed with vertical open grooves, which coincide to form a closed groove, when brought together, and in which a conducting and connecting wire is embedded and the assembled parts held in register by appropriate means. In a pending application filed by me, Serial No. 737,277, is shown a similar construction to that before described other than that both the solid vertical edges *b b* are formed with beads or ribs.

The chief value and utility of the specific elemental unit-plate shown in Fig. 3 and first above described as of my present invention resides in the capability it furnishes of constructing a small two-unit battery-plate, the bead or rib *m* of the unit A being inserted in the open groove *n* of the unit B, avoiding the necessity for employing any central conducting and connecting wire like the end wires C C, said bead *m* furnishing a keying device when brought into register with the open groove *n* of the unit-plate B. The said plates A and B are provided on one of their edges in the groove *n* thereof, as before, with conducting-wires C C, soldered thereto, as indicated at B' in the drawings, and with like soldering B', holding the unit-plates together.

Having thus described my invention, I claim as new and desire to secure by Letters Patent—

1. A unit-plate for a battery-electrode, consisting of a centrally-slatted structure with continuous solid edge portions one of which is provided with a projecting longitudinal bead or rib and the other of which is exteriorly grooved longitudinally; substantially as described.

2. A battery-plate composed of two unit-plates each consisting of a slatted structure having vertical solid edge portions, one of said units being exteriorly grooved on one of its vertical edge portions and the other of said units having one of its edge portions provided with a projecting longitudinal bead or rib adapted to coincide with the groove of the other unit-plate; with means such as solder fastenings B' to maintain said parts in assembled position, and with conducting-wires C C embedded in the outer vertical edge portion of each of said pair of unit-plates; substantially as described.

In testimony whereof I have hereunto affixed my signature this 7th day of November, A. D. 1899.

RODERICK MACRAE.

Witnesses:
WALTER C. PUSEY,
H. T. FENTON.